United States Patent [19]

Lu et al.

[11] Patent Number: 5,297,272

[45] Date of Patent: Mar. 22, 1994

[54] APPARATUS FOR AUTOMATICALLY DISABLING AND ISOLATING A COMPUTER'S ORIGINAL PROCESSOR UPON INSTALLATION OF A PROCESSOR UPGRADE CARD

[75] Inventors: Gene Y. Lu, San Clemente; David L. Kelly, Mission Viejo; Norman M. Hack, Tustin; Scott R. Rushford, Huntington Beach, all of Calif.

[73] Assignee: Advanced Logic Research, Inc., Irvine, Calif.

[21] Appl. No.: 388,445

[22] Filed: Aug. 2, 1989

[51] Int. Cl.$^5$ .............................. G06F 15/76
[52] U.S. Cl. ........................ 395/500; 395/800; 364/DIG. 2; 364/929.2; 364/929.5; 364/929.71
[58] Field of Search ... 364/200 MS File, 900 MS File; 395/800, 500

[56] References Cited

U.S. PATENT DOCUMENTS

| | | | |
|---|---|---|---|
| 4,530,066 | 7/1985 | Ohwaki et al. | 364/708 |
| 4,531,198 | 7/1985 | Matsuda | 395/575 |
| 4,562,535 | 12/1985 | Vincent et al. | 395/325 |
| 4,680,674 | 7/1987 | Moore | 361/395 |
| 4,703,419 | 10/1987 | Krause et al. | 364/200 |
| 4,716,526 | 12/1987 | Mori et al. | 364/200 |
| 4,794,523 | 12/1988 | Adan et al. | 364/200 |
| 4,882,702 | 11/1989 | Struger et al. | 364/900 |
| 4,885,482 | 12/1989 | Sharp et al. | 307/465 |
| 4,967,346 | 10/1990 | Freidin | 364/200 |
| 4,997,377 | 3/1991 | Goto et al. | 439/68 |
| 5,040,990 | 8/1991 | Suman et al. | 439/34 |
| 5,109,517 | 4/1992 | Houda et al. | 395/800 |

OTHER PUBLICATIONS

Intel, "iAPX 86/88, 186/188 User's Manual, Hardware Reference," 1985, pp. 1-63, 1-65 and 1-110 to 1-112.
Computer & Software News, vol. 6, Issue 32, p. 26, Aug. 8, 1988.
Peck, Robert A., "Expanding Your Apple's Applications," Byte, Dec. 1984, pp. A45-A47, A122-A126.
Moskowitz, Robert, "Appli-card—Enhancing Your Apple," Interface Age, Aug. 1983, pp. 107-111.
Heck, Mike, "Quadlink, Running Apple Software on an IBM PC," Interface Age, May 1984, pp. 108-110.
Morganstein, David, "ALF's 8088 Coprocessor," Byte, Dec. 1984, pp. A38-A43.
"386SX/387SX Board Design with Neat and Chips/250" Product Alert, Chips and Technologies, Inc., Sep. 1988.
"Update on Neat Plus SX Module", Product Alert, Chips and Technologies, Inc., 1989.
"Gal ® Data Book", Lattice Semiconductor Corporation, Spring 1988, pp. 1-31.
Y. Shimazu, et al., LSI Research and Development Laboratory, Mitsubishi Electroc Corporation, "24-bit Floating Point Digital Signal Processor/mSP2", Mar. 25, 1988, pp. 49-54.

Primary Examiner—Parshotam S. Lall
Assistant Examiner—Richard Lee Ellis
Attorney, Agent, or Firm—Mason, Fenwick & Lawrence

[57] ABSTRACT

A system and method for upgrading a computer is disclosed. Certain essential chips present in the original computer system are functionally, but not physically, removed from the computer system. The functions which would otherwise be performed by the original chips are instead performed by higher-performance chips on a plug-in module which is plugged into the computer system. The functional removal of the certain chips from the original computer system is achieved through simple insertion of the plug-in module. No replacement or substitution of original chips or boards is necessary.

63 Claims, 7 Drawing Sheets

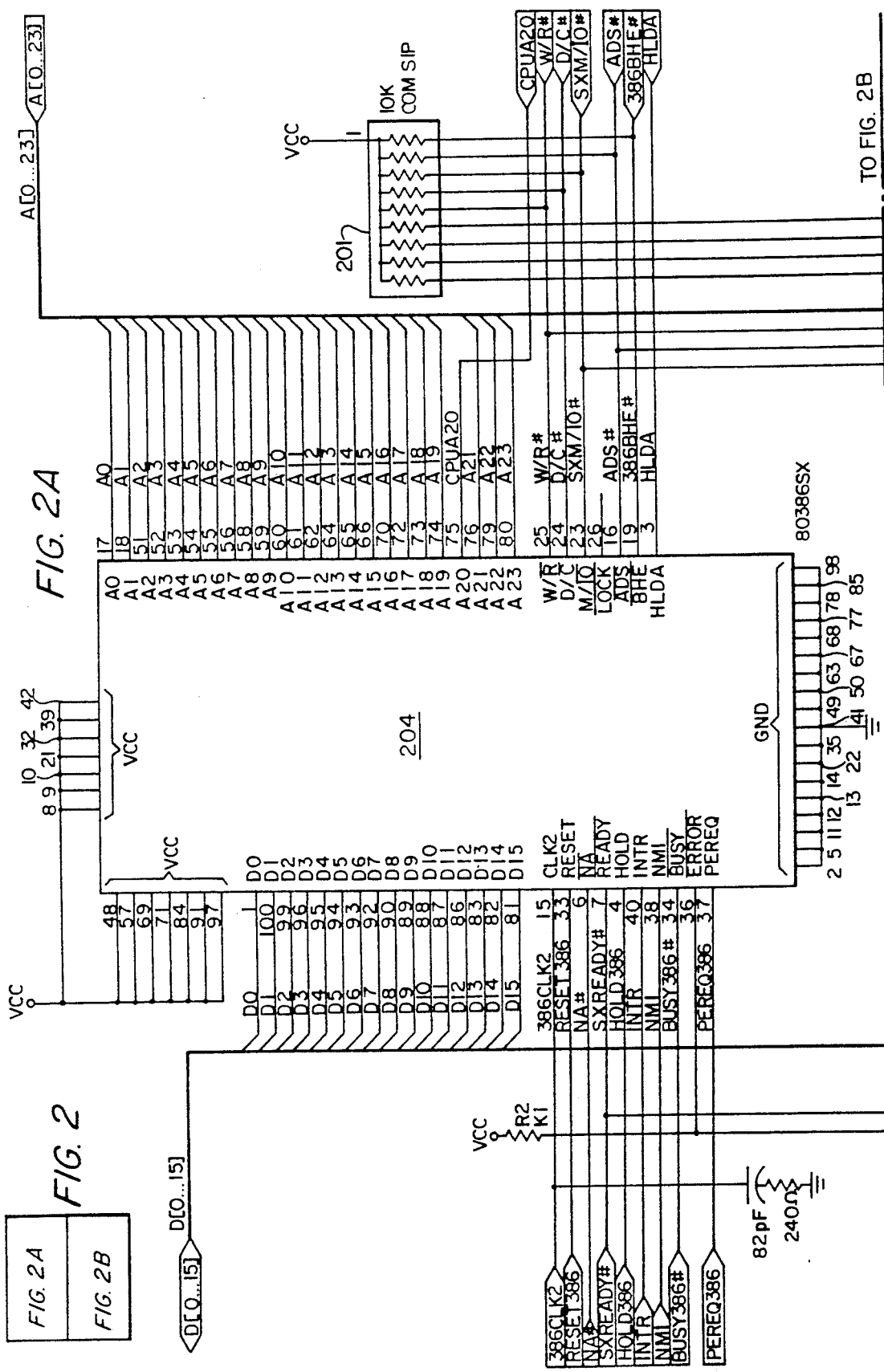

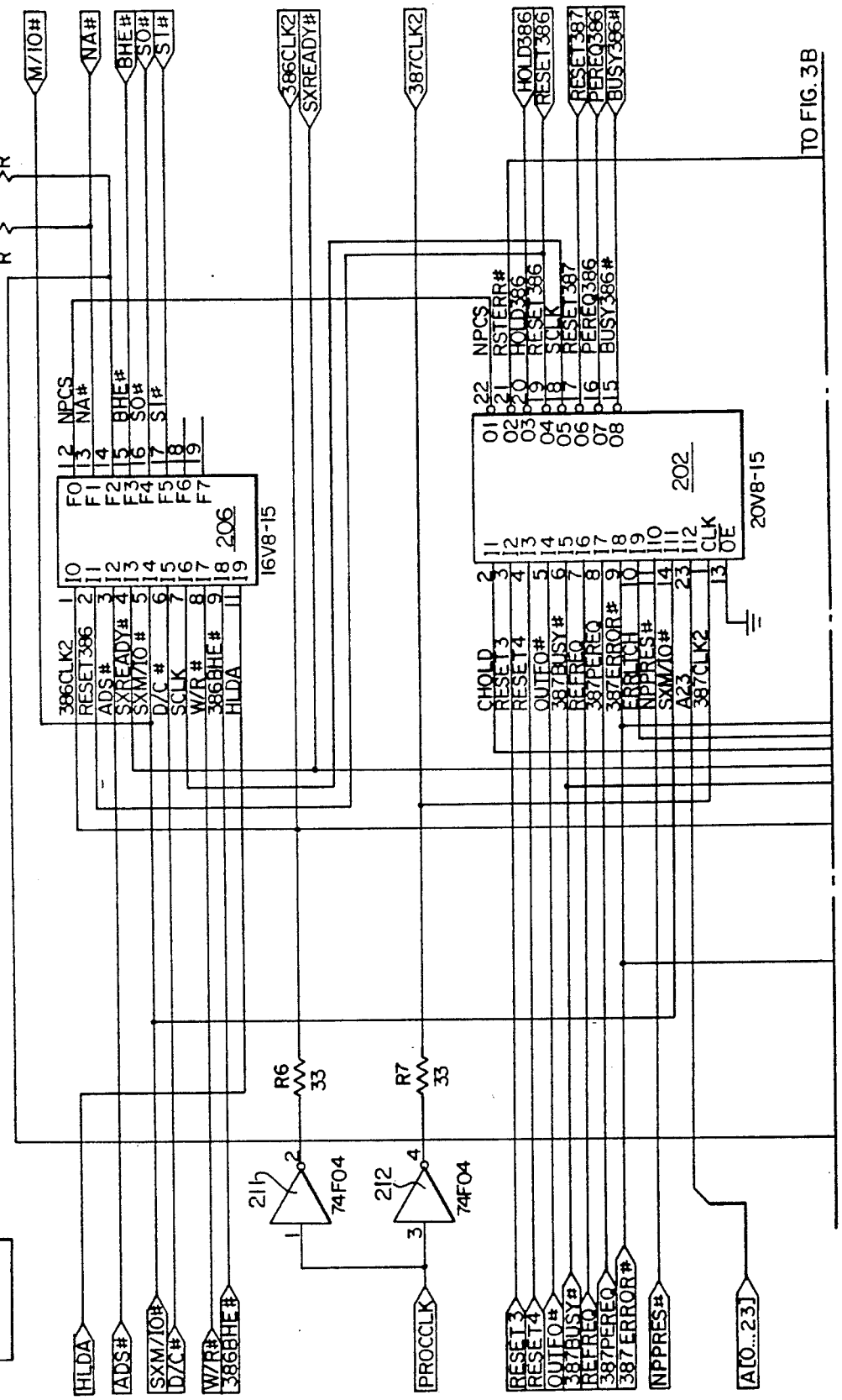

APPARATUS FOR AUTOMATICALLY DISABLING AND ISOLATING A COMPUTER'S ORIGINAL PROCESSOR UPON INSTALLATION OF A PROCESSOR UPGRADE CARD

BACKGROUND OF THE INVENTION

1. Field Of The Invention

The present invention relates to computer systems which are performance upgrades of other computer systems. More specifically, the invention relates to computer systems in which one or more important elements, such as the central processing unit, of a known computer system are replaced with elements having higher performance characteristics.

2. Related Art

It is known in the art that given computer systems may be upgraded in performance through substitution of elements. The new elements have higher performance capabilities than elements in the original system.

For example, in the field of personal computers, the IBM® AT TM computer (available from International Business Machines Corporation, Armonk, N.Y.) is known. This known computer operates using an 80286 processor and an 80287 math co-processor available from, for example, INTEL Inc. of Santa Clara, Calif. Other manufacturers have since designed computer systems which, although still compatible with the original 80286-based AT TM computer, are considered in some respects to be enhancements of it.

One manufacturer, Chips & Technologies, Inc. (C&T), 3050 Zanker Road, San Jose, Calif. 95134, has developed a chip set known as the NEAT TM chip set. The NEAT TM chip get is described in data sheets entitled "CS-8221 New Enhanced AT TM (NEAT TM Data Book", (part/catalog no. 2221-B 10M 3/88 Rev. 2, which, like all technical documents cited in this specification, is incorporated by reference as if reproduced in full below. See also C&T PRODUCT ALERT PA76.2/9-88, UPDATE—Sep. 21, 1988, "386SX/387SX BOARD DESIGN WITH NEAT AND CHIPS/250," and PA115/3-89, "UPDATE ON NEAT PLUS SX MODULE."

The C&T NEAT TM chip set has allowed development of AT TM -compatible computer systems. Among the systems which are AT TM -compatible is the 80286-based POWERFLEX TM system from Advanced Logic Research, Inc. (ALR), 9401 Jeronimo, Irvine, Calif. 92718. As will be better appreciated by a reading of the Detailed Description of the Preferred Embodiments of the present invention (below), this computer system may advantageously be used in conjunction with the present invention.

There are several known methods of upgrading an AT TM -compatible 80286-based computer systems.

A first upgrade method involves an "add-in card" which is inserted into the AT TM bus, and in which a cable is extended form the add-in card to the CPU (central processor unit) socket on the system board. In a second upgrade method, a circuit board containing a higher performance CPU is inserted into the CPU socket. Both these methods involve the physical removal of the 80286 processor from its socket.

These known methods possess several disadvantages. The removal of a chip from the original processor board is not convenient for the user or customer. In fact, physical removal of the 80286 and insertion of the intercardconnecting cable (or second board) into the original processor's socket may even cause physical or electronic damage, if not performed properly.

Furthermore, it is generally known that increased performance may be obtained through increasing CPU clock speed. These two methods, involving insertion of a cable or board into the CPU socket, do not provide for changing the clock speed. To change clock speeds using either of these two known methods, the crystal itself must be replaced. Replacement of a crystal is both inconvenient and dangerous to components.

Both of the above-described methods may decrease reliability due to introduction of unwanted signal noise into signals entering and leaving the CPU socket. Also, boards or cables plugged directly into the CPU socket may vibrate loose, causing intermittent connections.

A third upgrade method involves placement of an add-in board into the AT TM slot, but in which the 80286 processor is not removed from the system board. The system powers up with the 80286 as the CPU. After powering up, however, system control is relinquished to the processor on the new board through what is commonly known as the "master mode". The master mode involves use of the DMA controller to request control of the external. AT TM bus, allowing the card to be "master" of the system.

This third method possesses the drawback that true AT TM system compatibility is sacrificed. True compatibility cannot be maintained because the card is functioning on an external bus, and not directly on the CPUI bus.

Therefore, there is a need in the computer industry for systems and methods for upgrading known computer systems which do not involve unnecessary cost, inconvenience for the user or customer, or introduction of features which are incompatible with any industry standards adhered to by the original computer system. Further, it is desirable to provide a system and method whereby a given computer system may be upgraded without the necessity of physically removing or replacing any portion of the original computer system, so as to minimize inconvenience and possibility of electronic or physical damage. It is further desirable to achieve these goals while maintaining compatibility with industry standards and maintaining system reliability.

SUMMARY OF THE INVENTION

The present invention provides a system and method for overcoming the disadvantages of known computer upgrade systems. The present invention provides a system and method for upgrading a computer in which certain essential chips present in the original computer system are functionally, but not physically, removed from the computer system. The functions which would otherwise be performed by the original chips are instead performed by higher-performance chips on a plug-in module which is plugged into the computer system.

Advantageously, the mere insertion of the plug-in module ensures that the original chips are disabled in favor of the enhanced chips present on the plug-in module. Also advantageously, no chips from the original computer system need be removed or replaced. Of still further advantage is the full compatibility with industry standards which were adhered to by the original computer system. Another advantage is the ability to effect a change in clock speed through mere insertion of the plug-in module.

Thus, the present invention envisions a computer system, taken as a whole, which is an upgrade of an earlier computer system. The present invention also encompasses a plug-in module which is capable of upgrading a given computer system. Furthermore, the invention encompasses methods for upgrading a given computer system using a plug-in module which easily and quickly replaces the functions of certain essential chips in the given computer system.

Other features and advantages of the present invention will become apparent to those skilled in the art upon a reading of the following Detailed Description of the Preferred Embodiments in conjunction with the accompanying drawings, Tables and Appendices.

BRIEF DESCRIPTION OF THE DRAWINGS

The invention is better understood while reading the following Detailed Description in conjunction with a review of the accompanying drawings, in which like reference designators refer to like elements throughout, and in which:

FIG. 2 shows the connection of FIGS. 2A and 2B. FIGS. 2A and 2B, collectively referred to hereinafter as FIG. 2, are logical diagrams illustrating the 80386SX processor 204 and 80387SX co-processor 203 as implemented in a plug-in module according to a first embodiment of the invention.

FIG. 3 shows the connection of FIGS. 3A and 3B. FIGS. 3A and 3B, collectively referred to hereinafter as FIG. 3, illustrate the Generic Array Logic (GAL ®), chips and the numeric processor interrupt logic as used in the first embodiment of the plug-in module according to the present invention

DETAILED DESCRIPTION OF THE PREFERRED EMBODIMENTS

In describing the preferred embodiments of the invention, specific terminology will be used, for the sake of clarity in describing the specific embodiments to those skilled in the art. However, the invention is not intended to be limited to the specific terms so selected, and it is understood that each specific term includes all technical equivalents which operate in a similar manner to accomplish a similar purpose. Also, particular chips, chip sets, industry standards, computer systems and other elements are presented and described in detail, so as to describe the particular embodiments presented. However, the invention is not to be limited by the particular embodiments contained herein, but should be defined only in accordance with the claims which follow and their equivalents.

Briefly, the preferred embodiments involve the use of the C&T NEAT TM chip set processor and, possibly also, a co-processor, and replacement of their functioning with either an 80386SX-based plug-in module or a 80486-based plug-in module (processor chips and documentation available from INTEL, order numbers 240187-002 and 240225-002, respectively). However, the teachings of the present invention should not be limited to these particular applications. The breadth and import of the present invention should be ascertained only in accordance with the claims.

Figure 1:
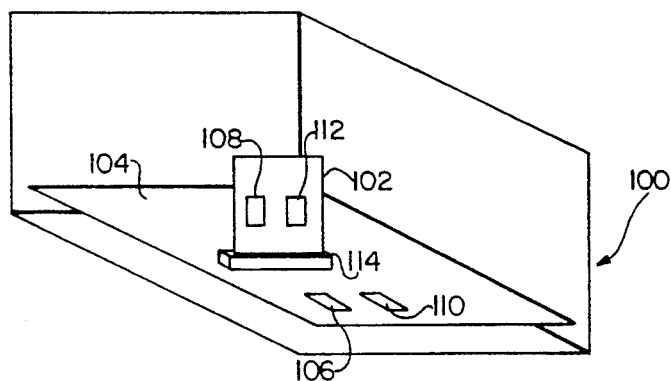
FIG. 1 is a schematic diagram illustrating the advantages of a preferred embodiment of the present invention in allowing a plug-in module 102 to assume the function of certain chips (such as 106 and 110) on the system board 104 of a computer system 100.

Referring now to FIG. 1, a computer system 100 with certain components are illustrated schematically. A system board 104 is illustrated as comprising a central processing unit (or "processor") 106 operating in conjunction with other essential chip elements 110. The essential chip elements 110 may include, for example, a math co-processor.

Before the present invention, a computer system would have comprised a processor chip, such as an 80286, and a co-processor such as an 80287. These two chips would have adhered to an industry standard, such as the IBM ® AT TM standard.

The present invention provides that the computer system comprising system board 104 may be upgraded without removal or replacement of any chips or boards, or addition of any substitute boards, to the system. The present invention provides for the addition of an inventive plug-in module 102 into a connector 114. The present invention provides that the mere fact that the plug-in module 102 is installed insures that the system performance will be enhanced, in accordance with the performance characteristics of the circuit elements on the plug-in module 102.

In one preferred embodiment, for example, the 80286 processor 106 on the existing system board 104 is functionally replaced by an 80386SX processor 108. Also, the 80287 co-processor 110 may be functionally replaced by an 80387SX co-processor 112. The connector 114 may be, for example, a connector, available from Burndy Corporation of Norwalk, Connecticut. In this manner, the simple addition of a plug-in module 102 enhances system performance, while not sacrificing the AT TM -compatibility of the system as originally configured with only system board 104.

It is understood that partial functional replacement is encompassed by the present invention. That is, not every essential chip on the system board 104 need be replaced, functionally, by a corresponding enhanced circuit on the plug-in module 102. Certain sub-sets of the essential chips may be enhanced.

Also, the simple insertion of the plug-in module need not be the only means of communicating to the rest of the system that the function of certain elements of the system board 104 are being usurped. It lies within the contemplation of the present invention that hybrid upgrades, involving combinations of the plug-in module and/or replacement or modification of the system board and/or addition of a supplementary board with a cable leading to the original processor slot, and so forth. In this manner, "upgrades of upgrades" are possible. The invention is not to be limited to a system configuration containing only the elements shown in FIG. 1. Additional elements may be present and still fall within the scope of the appended claims, even if the additional elements are involved in other performance enhancement schemes.

The details of operation of the embodiments of the present invention will next be presented.

Figure 3B:
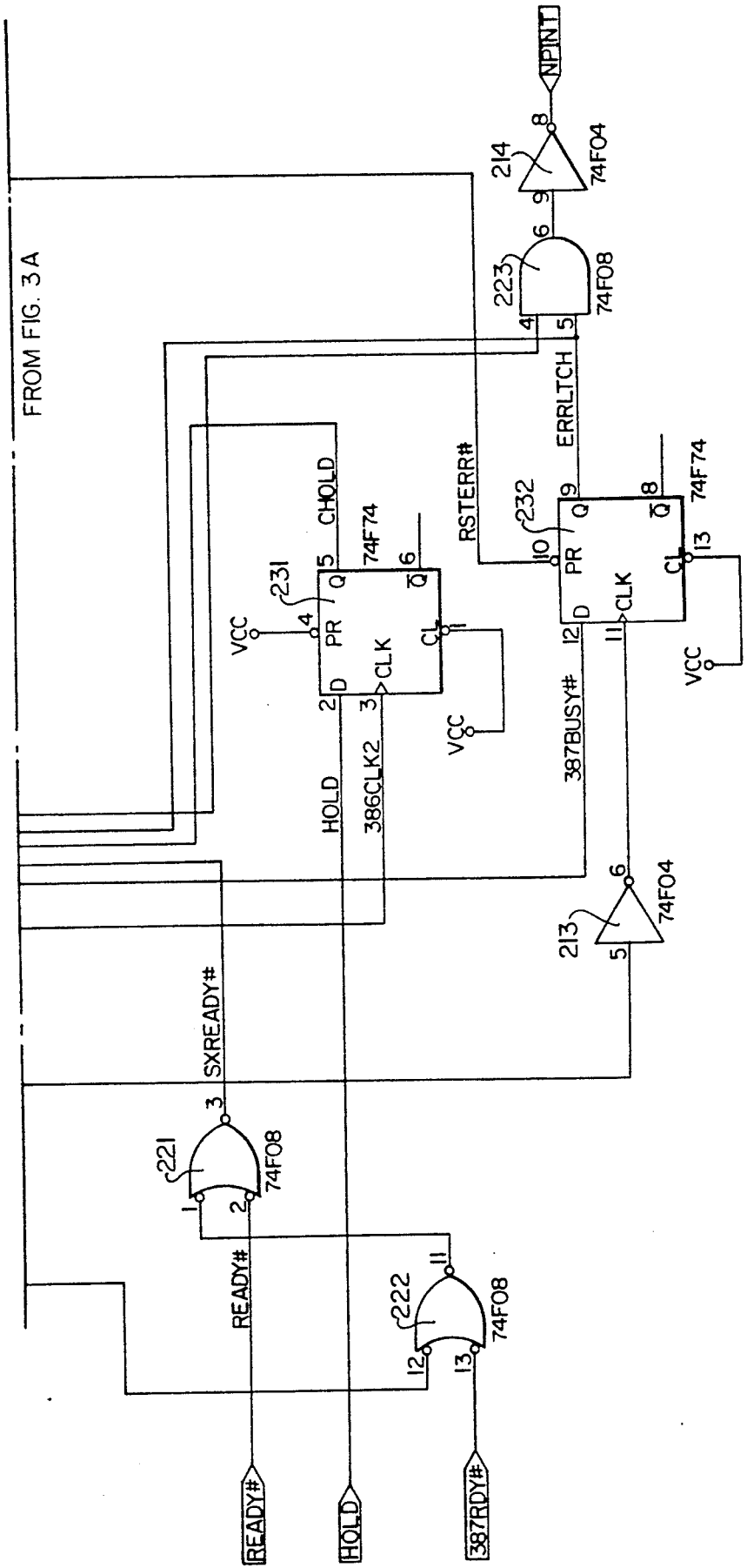

Shown in FIG. 3 are two logic devices 206 and 202. These logic devices may be implemented using a variety of circuits, but generic array logic (GAL ®) and programmable array logic (PAL ®) chips are preferred. In the exemplary illustrated embodiment, GAL chips 206 and 202 are GAL 16V8-15 and GAL 20V8-15, respectively, available from Lattice Semiconductor Corporation, P.O. Box 2500, Portland, Ore. 97208; 555 N. E. Moore Court, Hillsboro, Ore. 97124. See "GAL ® DATA BOOK," (Lattice, 1988). As is known in the art, certain GAL ® chips, such as the V series from Lattice Semiconductor Corporation advantageously allow the outputs to be either combinatorial or registered, allowing design flexibility and minimization of IC count.

Briefly, GAL ® 206 converts signals (such as status and control signals) from the 80386SX format and timing into other (e.g., status and control) signals which are readily usable by circuits expecting format and timing from an 80286 processor. This allows the rest of the computer system to be "spoofed" into believing that an 80286 processor may still be present and operating in the computer system. In particular, the computer system is still AT TM -compatible.

The following is a description of the signals which are input and output to GAL ® 206. A brief description of the origin, function and destination of certain signals is presented. However, most of the signals are used in a manner consonant with their use on the 80286 system board, so that those skilled in the art would readily appreciate the implementation and use of the signals on the preferred plug-in module according to the present invention.

Referring to FIG. 3, the input and output signals of GAL ® 206 will first be described.

Pins 1 through 9, 11 and 12 are input signals; pins 13 through 19 are output signals.

Pin 1: 386 CLK2: An inverted form of the signal PROCCLK from the system board. In inverter 211 (FIG. 3) inverts PROCCLK to account for the fact that the 80286 processor triggers on the negative edge of its clock signal, while the 80386SX triggers on its positive edge.

Pin 2: RESET 386: A clock reset signal originating directly from the second GAL ® 202, described in greater detail below.

Pin 3: ADS#: An address strobe signal generated by the 80386SX, used to indicate that a new cycle has begun, or that a new address and status signals have been presented on the bus.

Pin 4: SXREADY#: A signal, also input to the 80386SX, indicating that a cycle is over. The signal is generated by combinatorial logic in FIG. 3, illustrated as logic elements 221 and 222. Briefly, the purpose of logic elements 221 and 222 are to govern the state of the SXREADY# signal. This signal is governed by three inputs. The two gates, 221 and 222, function equivalently to a 3-input, active-low OR gate.

The first input is the READY#signal generated from the chip set on the system board. The function of this READY# is published and, therefore, readily available to those skilled in the art.

The second input is the 387RDY# signal, which is a signal output by the 80387SX chip at pin 57, signal READY0-. Its function, similarly, is published, and is therefore available to those skilled in the art.

A third input to the combinatorial logic is the signal output from pin 14 of the GAL ® 206. As can be seen from the 206 logic equations (Appendix A), this signal is activated during a halt instruction or a shut-down. This signal is needed because the NEAT TM chip set would not provide a signal in these circumstances, causing the system to hang indefinitely. The system would hang, were it not for the fact that the SXREADY# signal can be activated by the signal from pin 14 of the 206 GAL ® .

In the preferred embodiment, the function of a three-input, active-low OR gate is implemented using two two-input 74FO8 NAND gates, connected in series. The output of gate 222 is input to the first input of the second gate 221. The second input of gate 221 receives the READY# signal. Gate 222 receives the 387 READY# signal and the signal from pin 14 of the 206 GAL ® . The output of gate 221 constitutes the SXREADY# signal.

Pin 5: SXM/IO#; Pin 6: D/C#; and Pin 8: W/R#: These three status signals, generated by the 80386SX, define which category of the eight cycle categories is presently being executed. A definition of the cycle categories is published, and therefore available to those skilled in the art.

Pin 7: SCLK: A signal generated at pin 18 of the second GAL ® 202, used to maintain the phase relationship for generating signals S0# and S1# at pins 16 and 17 of the first GAL ® 206. The SCLK signal provides for a division by two of the clock signal from, in the preferred embodiment, 32 MHz to 16 MHz.

Pin 9: 386 BHE#: A Byte High Enable signal, generated by the 80386SX, governing a choice of operating on only 8 of 16 bits, for example, on devices having only 8-bit data lines.

Pin 11: HLDA: A Hold Acknowledge signal generated by the 80386SX, causes the outputs of GAL ® 206 to enter a high-impedance state.

Pin 12: NPCS: This input to the first GAL ® 206 is identified at pin 22 of the second GAL ® 202. The signal, described below, is active only if the present cycle is a co-processor cycle and a 387 processor is installed. Ultimately, this prevents the chip set on the system board from responding when it should not respond.

The outputs of GAL ® 206 will next be described.

Pin 13: NA#: This "Next Address" signal is important to an understanding of an advantage of the present invention.

As a background to understanding the importance of the NA# signal, it should be appreciated that implementing the plug-in card for the 80386SX upgrade causes a problem to arise because of the difference in the definition of the status signals output by the 80386SX which start its cycles. A certain known system translates the 80386SX status signals to an 80286 format. However, this known implementation of the status signal translation causes time to be lost, resulting in reduced system performance.

The 80386SX has an input signal, named /NA, which can be used to request the CPU place the "Next Address" onto the bus to begin the next cycle before the current cycle has completed. In the known translation scheme referred to immediately above, the /NA signal is either active all of the time, or is never active. When /NA is always active, it is necessary to employ four 74F373 latches, with latch control logic, so as to latch address and status signals to maintain them in proper time relation for the system board chip set.

This known translation scheme does not utilize the /NA signal to its fullest advantage. As appreciated by the present invention, the function of beginning the next cycle before the current cycle has completed can be used to save the time lost in translating 80386SX status signals to status signals having the 80286 format. In designs according to the present invention, the /NA signal is controlled to allow the release of the next address when the changing of the address will not adversely effect the functioning of the system board chip set. This selective control of the /NA input (here fed directly from the NA#output of first GAL® 206) is achieved by simulating the timing of the 80286 processor which only guarantees the address to be valid during limited timing periods. In this manner, the present invention provides an implementation of the status signal translation circuit using fewer IC's, while not sacrificing the speed which would otherwise be lost due to the translation process.

Pin 14: As described above, with respect to the SXREADY# input on pin 4, the output of pin 14 is fed back to a gate 222, for ultimate generation of the SXREADY# signal. The generation of the 206 GAL® output on pin 14 is determined according to the GAL® equations in Appendix A.

Pin 15: BHE#: The byte high enable signal is also generated according to the equations in Appendix A, and is sent to the system bus for governing cycles where only one of the two bytes is to be transferred.

Pin 16: S0# and Pin 17: S1#: These status bits are generated according to the GAL® equations in Appendix A, and are sent to the system board for control of the function of defining the status of new cycles.

Pins 18 and 19: These two signals are associated with the state machine, and serve the function of maintaining time relationship throughout the cycle.

As can be seen on FIG. A2, the two signals NA# from pin 13 of GAL® 206, and the signal from pin 14 of GAL® 206, are connected to respective resistors of value 1K-ohms to VCC.

The signals entering and leaving second GAL® 202 will next be described.

Pins 1 through 11, 13, 14 and 23 are inputs, and pins 15 through 22 are outputs. The inputs will first be described.

Pin 1: 387 CLK2: This signal is an inverted form of the PROCCLK signal generated on the system board. It is essentially the same signal as the corresponding pin on first GAL® 206.

Pin 2: CHOLD: The CHOLD signal, generated by the data output of a D-type flip-flop 231, allows maintenance of the proper clock relationships. As will be described below, the CHOLD signal is a delayed form of the HOLD signal generated on the system board. This signal functions as a request to the 80386SX to give a hold acknowledge, and relinquish the data bus for such functions as direct memory accesses and refresh cycles.

Pins 3 and 4: RESET3 and RESET4: These signals are generated on the system board, and, generally, serve as software-invoked reset signals to the 386, and as power-up signals to the 386 and 387, respectively.

Pin 5: OUTF0#: This signal is generated on the system board, and is involved in the write cycle of the I/O Port F0. Here, it is used as a co-processor status signal. The INTEL Application Note B3-STEP 80387 stepping information (p. 11) describes the use of this signal.

Pin 6: 387BUSY#: This signal is generated by the 80387SX, and functions in a manner known to those skilled in the art.

Pin 7: REFREQ: This signal is generated on the system board, and functions in a manner known to those skilled in the art.

Pin 8: 387PEREQ: This signal is generated by the 80387SX, and functions in a manner known to those skilled in the art.

Pin 9: 387ERROR#: This signal is generated by the 80387SX, and functions in a manner known to those skilled in the art.

Pin 10: ERRLTCH: This signal is a latched error signal which is generated at the data output of a second D-type flip-flop 232, to be described in greater detail below.

Pin 11: NPPRES#: This signal is normally pulled high by means of a 10K pull-up resistor on a single in-line package 201 (FIG. 3). The signal is also connected to ground signal 66 on the 80387SX socket. In the preferred embodiment, this is used as a signal to inform the rest of the circuit of the presence of an 80387SX chip in the socket.

Pin 14: SXM/IO#: This signal is one of the three signals defining the present cycle as belonging to one of eight categories, described above, with respect to pin 5 of the first GAL® 206.

Pin 23: A23: This input is tied to A23.

Pin 13: GND: The output enable signal is always active (low), so that the output of the second GAL® 202 are not forced to a high-impedance state.

The outputs of second GAL® 202 will now be described.

Pin 22: NPCS: This signal prevents improper control of the 80387SX co-processor, specifically preventing the system board chips at from controlling it. The NPCS signal is directly input to pin 12 of the first GAL® 206. The NPCS signal, like all other signals output from the second GAL® 202, are generated in accordance with GAL® equations reproduced in Appendix B.

Pin 21: RSTERR#: This signal resets the second D-type flip-flop 232, and serves to reset a latched error signal relating to the co-processor interface. It is directly connected to the pre-set input pin 1 of the flip-flop 232.

Pin 20: HOLD386: This signal is input to the HOLD input of the 80386SX.

Pin 19: RESET386: This signal is input to the RESET input of the 80386SX.

Pin 18: SLCK: This clock signal is input to pin 7 of the first GAL® 206. As described above, it serves to divide by two a clock signal ultimately involved in the generation of the S0# and S1# signals output from first GAL® 206.

Pin 17: RESET387: This signal is input to the RESET input of the 80387SX.

Pin 16: PEREQ386: This signal is input to the PEREQ input of the 80386SX.

Pin 15: BUSY386#: This signal is input to the BUSY- input of the 80386SX.

Equations for generation of the above output signals from second GAL® 202 are presented in the equations of Appendix B. Those skilled in the art are readily able to understand and implement a GAL® performing the above functions, given the present description and the accompanying equations.

Referring now to the logic components 213, 223 and 214, which are connected to D-type flip-flops 231 and 232 (entry listed above), the control of the numeric processor interface for the 80387SX will now be described.

The data input of flip-flop 231 receives the HOLD signal from the system board. The HOLD input is clocked into 231 by signal 386CLK2, which is an inverted version of the clock PROCCLK, itself generated on the system board. The active-low clear input of the flip-flop 231 is tied high. Flip-flop 231 produces the CHOLD signal which is input to pin 2 of second GAL® 202.

Second flip-flop 232 receives its data input from the 387BUSY# signal generated by the 80387SX /BUSY output. The clock input of flip-flop 232 is received from the output of inverter 213. The input of inverter 213 receives its input from the 387ERROR# signal output from the /ERROR output pin 35 of the 80387SX. The clear input of the second flip-flop 232 is tied high. As described above, the pre-set input of second flip-flop 232 is driven by the RSTERR# signal generated by pin 21 of second GAL® 202. The second flip-flop 232 generates a data output signal ERRLTCH which drives two inputs. The first input has already been described above, the pin 10 input to second CAL® 202. The second input of NAND gate 223. The first input of gate 223 is the 387ERROR# signal which is generated by the output pins ERROR on the 80387SX. The output of NAND gate 223 drives the input of inverter 214. The output of inverter 214 produces signal NPINT (numeric processor interrupt), which is sent to the system board, tied to the output of a tri-state buffer 324 (FIG. B2).

Speaking conceptually, the flip-flop and logic arrangement just described causes a numeric processor interrupt immediately if there is an error detected, because of the direct connection of the 387ERROR# signal to the input of NAND gate 223. Also, an interrupt is generated if the 387BUSY# signal is clocked into the flip-flop 232 by the rising edge of the inverted 387ERROR# signal as it becomes active. As described above, the latch 232 is pre-set by the RSTERR# signal, generated at pin 21 of second GAL® 202.

Next, the clock selection arrangement and the connector for the preferred plug-in module for the 80386SX upgrade. These features are illustrated in FIG. 4.

Figure 4:
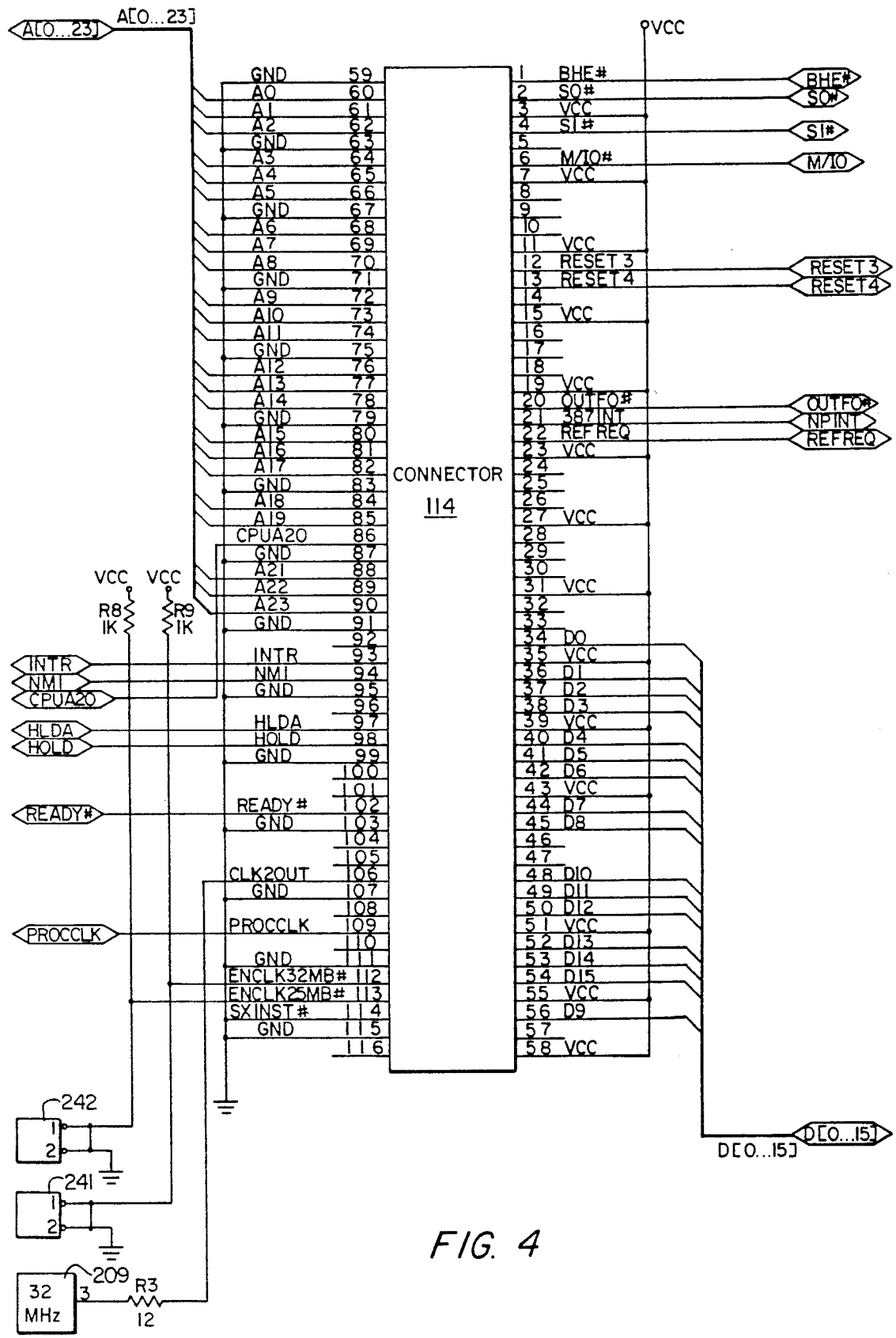
FIG. 4 illustrates a connector 114 and part of the clock selection logic from the first embodiment of the plug-in module according to the present invention.

Referring now to FIG. 4, a commonly employed 32 MHz high-frequency crystal oscillator is shown at location 209. The 32 MHz clock oscillator at 209 produces the CLK2OUT signal which drives pin 106 of the plug-in module's connector 114. Preferably, a 12-ohm resistor is inserted in series to provide proper loading characteristics.

A connection of signals from the 80386SX plug-in module and the system board is made through the connector which is shown as 114 in FIG. 4. Also, Table I presents the connector pin connections in conjunction with the schematic signal names and source/destination names of the signals as they are generated or received on the plug-in and system boards. Those skilled in the art, upon inspection of the figures and associated tables, are able to implement the preferred embodiment of the enhanced computer system according to the present invention.

Pins 112 and 113 of connector 114 receive the ENCLK32MB# and ENCLK25MB# signals, respectively. In the preferred embodiment, each of these two signal lines are tied directly to ground during operation. Jumpers 241 and 242 are not needed, operationally, but are used during the development phase for flexibility.

In the preferred embodiment, when the signals are low (tied to ground), the corresponding clock, either 32 MHz or 25 MHz, is disabled. These signals are used on the system board to enable a desired clock. For example, the 80286 processor functions on a 12.5 MHz clock which is derived from the 25 MHz clock enabled by the ENCLK25MB# signal. Conversely, when an 80386SX processor from the plug-in module is active, then a 16 MHz clock derived from a 32 MHz clock is enabled by the ENCLK32MB# signal. The preferred circuitry by which the proper clock signal is selected is described in this specification in detail, in the section relating to the system board circuitry illustrated in FIG. B2.

Figure 2B:
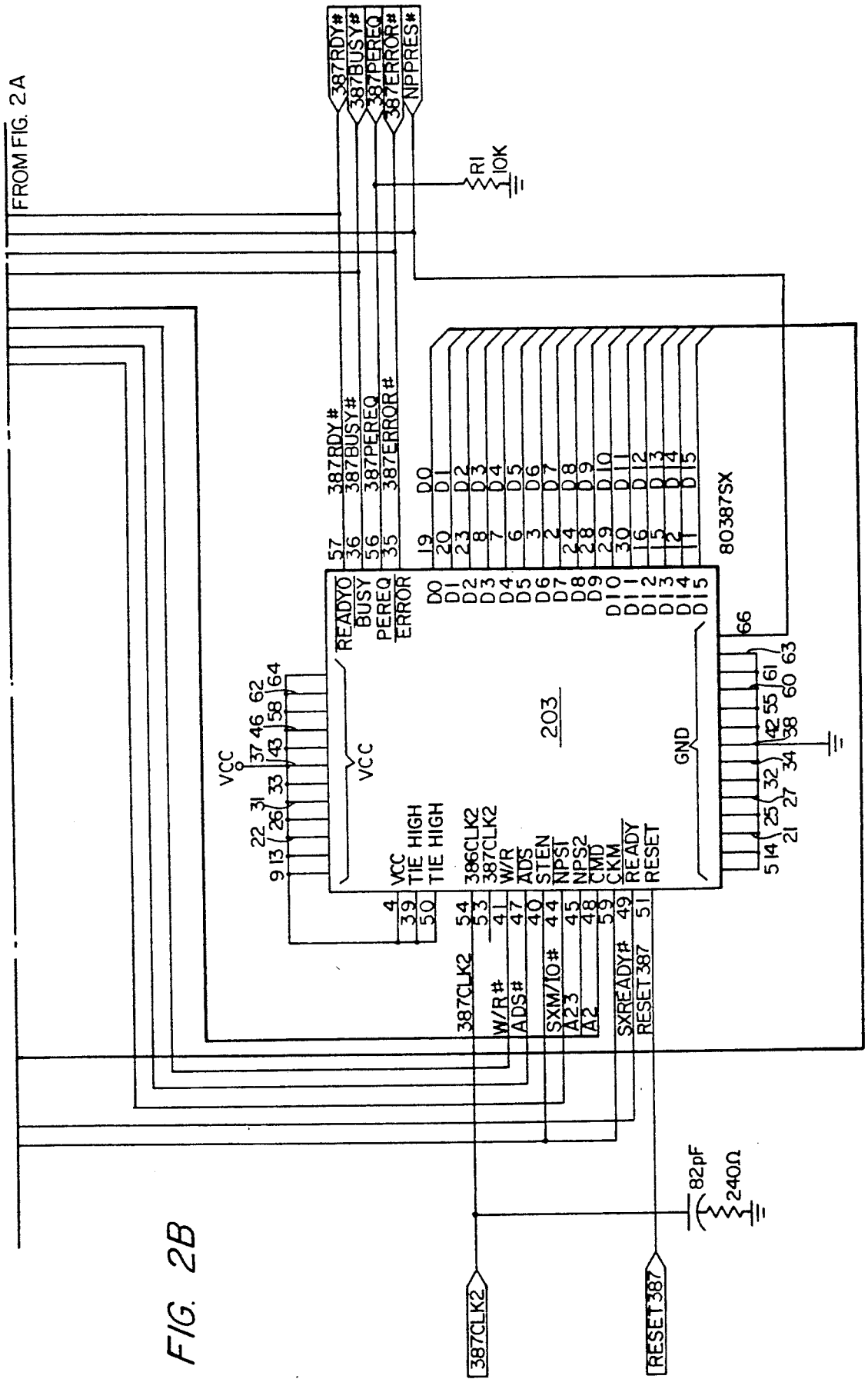

Referring now to FIG. 2, the 80386SX processor and the 80387SX co-processor are illustrated in a preferred configuration. Table II and Table III recite the pin connections which are shown in FIG. A1. Generally, the signals are used in a manner known to those skilled in the art. The accompanying drawings, Table II and Table III, and the accompanying text allow those skilled in the art to implement the plug-in module and the enhanced computer system according to the present invention.

Referring more specifically to FIG. 2 it is seen that the following connections are made. The active-low ERROR input signal on pin 36 of the 80386SX processor is tied to VCC through a 1K resistor. Similarly, the STEN and CKM inputs of the 80387SX co-processor are also tied high to VCC, also through the 1K resistor.

The CLK2 input of the 80386SX processor receives the 386CLK2 signal from the output of inverter 211 (FIG. 3), driven through a 33-ohm series resistor. The 386 CLK2 signal is the inverted version of the PROCCLK signal generated on the system board.

Similarly, the 386CLK2 input on pin 54 of the 80387SX co-processor receives the 387CLK2 signal which was generated by inverter 212 (FIG. 3), which signal is also driven through a 33-ohm series resistor. This 387CLK2 signal is the inverted form of the PROCCLK clock signal generated on the system board. The two signals, 386CLK2 and 387CLK2, are advantageously filtered to remove noise from the clock signal. Such filters are advantageously implemented using a series combination of an 82 picofarad capacitor and a 240-ohm resistor to ground. Separate capacitor-resistor filters should be used for the two clock signals (386CLK2 and CLK2). It is advantageous to pull up certain signals to insure that they are at required levels. It is preferable to implement the pull up function using a single in-line package (SIP) of 10K resistors with one common end tied to VCC. The signals which are individually tied to respective 10K resistors include the following:

W/R# output from the W/R- signal on pin 25 of the 80386SX processor;

The D/C# signal output from the D/C- signal on pin 24 of the 80386SX processor;

The SXM/IO# signal output from the M/IO- pin 23 of the 80386SX processor;

The ADS# signal output from the ADS- output pin 16 of the 80386SX processor;

The 386BHE# signal output from the BHE- pin 19 of the 80386SX processor;

The 387RDY# signal output from the READY0- output pin 57 of the 80387SX co-processor;

The 387BUSY# signal output from the BUSY- output pin 36 of the 80387SX co-processor;

The 387ERROR# signal output from the PEREQ output pin 56 of the 80387SX co-processor; and The NPRES# which is treated as effectively being an output from the normally grounded input pin 66 of the 80387SX co-processor (used as an input to pin 11 of second GAL® 202 (FIG. 3) to report the presence of an 80387SX processor in the co-processor socket 203 on the plug-in module).

The 387PEREQ signal normally output from the PEREQ output pin 56 of the 80387SX co-processor is tied low through a 10K resistor to ground, so as to put the signal in a known low state when the 80387SX co-processor chip is not inserted. The default low state of this 387PEREQ signal is designed to insure AT TM compatibility.

The connections between the 80386SX processor and the 80387SX co-processor will next be presented.

The W/R- output pin 25 of the 80386SX processor generates the W/R# signal which is input to the W/R- pin 41 of the 80387SX co-processor. The M/IO- output pin 23 generates the SXM/IO# signal which is input to the NPS1 input pin 44 of the 80387SX co-processor. The ADS- output pin 16 of the 80386SX processor generates the ADS# signal which is input to the ADS- input pin 47 of the 80387SX co-processor.

Any other connections of the input or output pins of the 80386SX processor or the 80387SX co-processor may be found through inspection of FIG. 2 and/or Tables II and III.

Figure 5B:
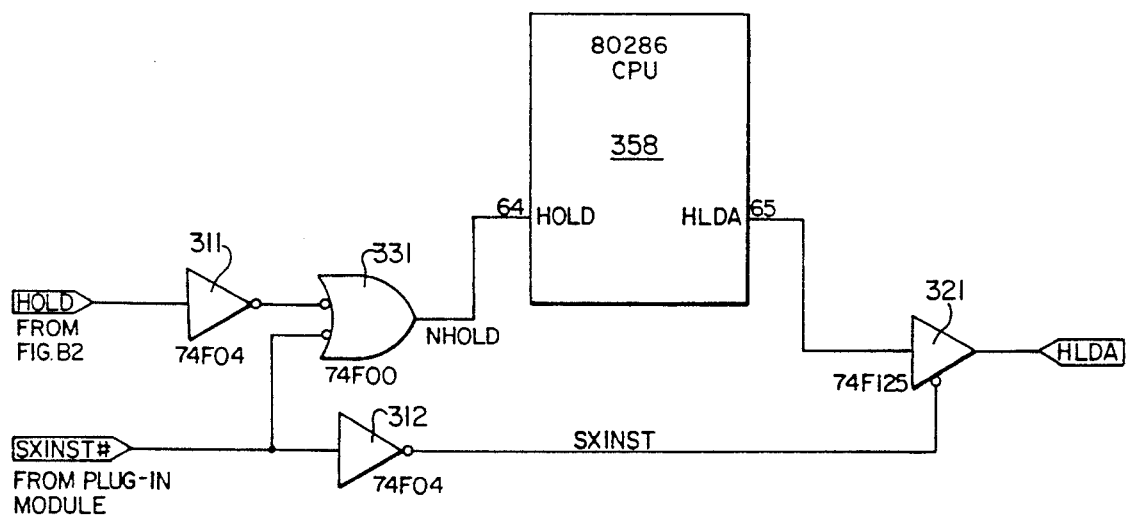
FIG. 5B illustrates a preferred implementation of another portion of the system board's clock selection logic, and numeric processor interrupt control logic.
Figure 5A:
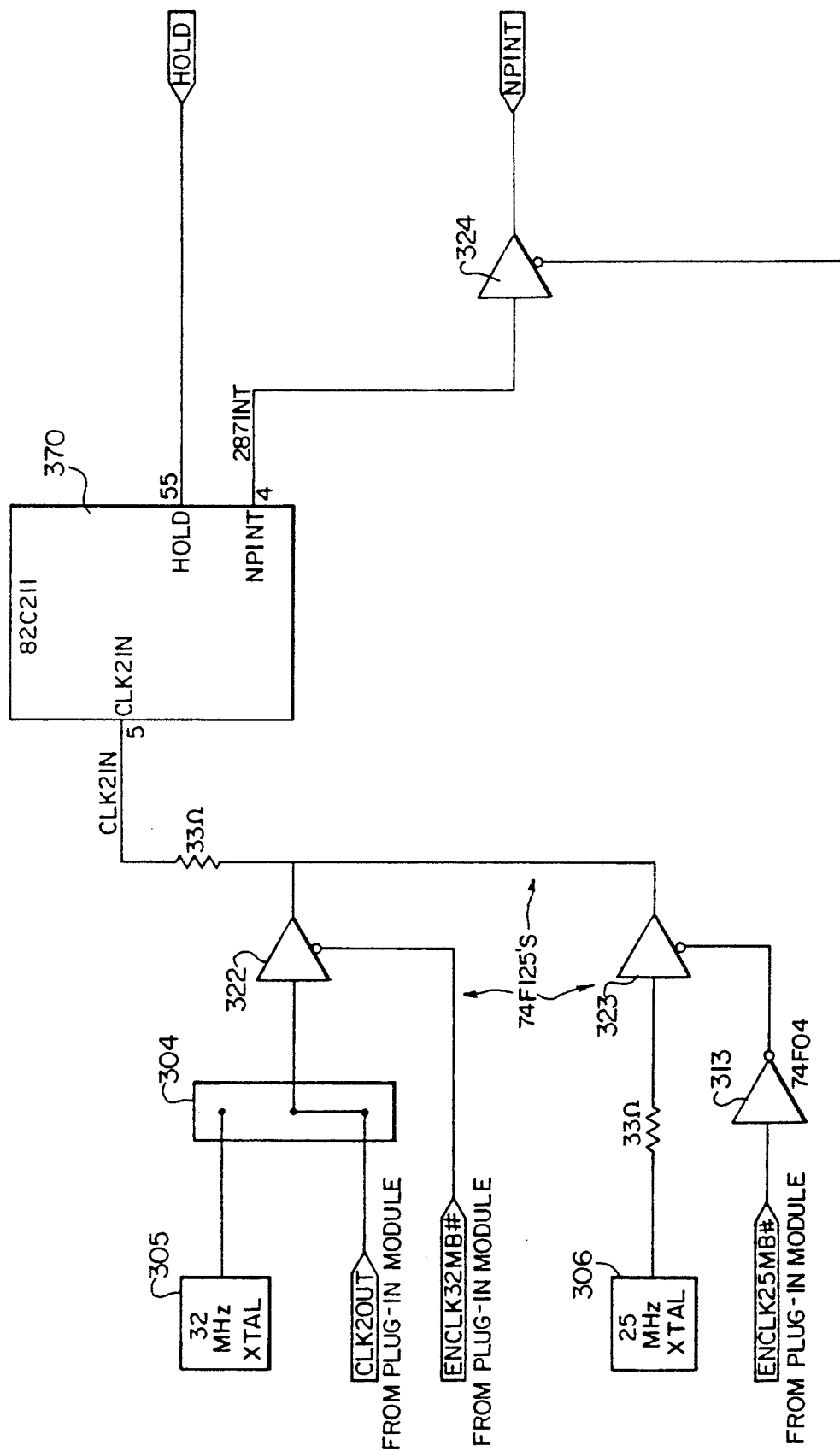
FIG. 5A illustrates a preferred implementation of a logic configuration on the 80286 system board, for allowing the 80286 processor to be functionally removed from the computer system when a plug-in module according to the present invention is installed.

Referring now to FIGS. 5A and 5B, the portions of the circuitry of the system board, which are of special interest to the present invention, will next be described.

FIG. 5A illustrates a preferred mechanism in which the 80286 processor on the system board is placed in a hold state, so as to allow the 80386SX processor on the plug-in module to take control of the system.

FIG. 5A illustrates the 80286 processor as element 358. Inverter 311 (preferably a 74F04), NAND gate 331 (preferably a 74F00), inverter 312 (preferably a 74F04) and tristate buffer 321 (preferably a 74F125) are illustrated in the following configuration. The HOLD signal output from HOLD output pin 55 of the NEAT TM 82C211 (FIG 5B) is input to inverter 311. The inverted HOLD signal from inverter 311 is input to the active-low input of gate 331. @20 The other input of gate 331 is governed by the SXINST# signal generated on the plug-in module, when inserted into connector 114. As shown in FIG. 4, the SXINST# indicates to gate 331 (FIG. 5A) when the 80386SX plug-in module is installed. When the 80386SX plug-in module is installed, pin 114 of connector 114 is grounded, so that the second input of gate 331 is driven low, into its active state.

The output of gate 331, signal NHOLD, drives the HOLD input pin 64 of the 80286 processor.

In this manner, either an activated SXINST# signal from the plugged-in 80386SX module (when installed), or the HOLD signal from the 82C211 chip, can force the 80286 processor into a hold state. Placing the 80286 processor into the hold state effectively removes it from the system.

As described more generally above, the effective removal of the 80286 processor from the system board by the simple insertion of a plug-in module is a central feature of the present invention. Using a very small number of logic gates, as shown in FIG. 5A, the functional removal of the 80286 processor (without necessitating its physical removal from the system board) constitutes a significant advance in the art.

The placement into the hold state of the 80286 processor causes the HLDA output signal on pin 65 to become active. The activation of the HLDA signal should be masked, to prevent any circuits receiving it from believing that no processor at all was in control of the system. In f act, according to the teachings of the present invention, the functional disablement of the 80286 processor on the system board is accompanied by the simple insertion of another processor, such as an 80386SX, on a separate plug-in module.

The presence of the 80386SX processor masks the activated HLDA signal from the 80286 processor on the system board in the following manner.

Referring again to FIG. 5A, the SXINST# signal generated near the plug-in board connector 114 as a result of the plug-in module's insertion is fed to inverter 312. Inverter 312 produces an active-high SXINST signal to indicate that the 80386SX plug-in module is installed. When the SXINST signal is active (high), it disables the output of a tristate buffer 321, whose input is the HLDA signal. In this manner, when the 80386SX plug-in module is installed, the HLDA signal output from 321 is governed by the HLDA output pin 3 of the 80386SX processor (FIG. 2). By virtue of the bus connection in which the HLDA signal from the 80386SX and the HLDA signal, which may be output from buffer 321, the disablement of buffer 321 relinquishes control of the hold acknowledge function to the new (80386SX) module.

On the other hand, when the 80386SX module is not installed, the SXINST signal (FIG. 5A) is low, allowing the HLDA signal output from the 80286 processor on the system board to control the system-wide HLDA signal shown at the far right of FIG. 5A.

FIG. 5B illustrates the preferred method of generating clocks for the system, and the method for generation of the numeric processor interrupt signal (NPINT). In particular, when the 80386SX plug-in module is installed into connector 114, the numeric processor interrupt signal NPINT is governed from that module, as described above, with respect to FIG. A2.

Generally, the 80387SX co-processor on the plug-in module is completely isolated from the chip set on the system board, with the exception of the interrupt (the interrupt is generated for numeric co-processing errors).

In known techniques to support an 80387SX co-processor, substantially more circuitry is required, and there still remains a question as to whether the known solution yields a machine which is fully AT TM compatible.

Referring now to FIG. 5B the 82C211 is shown with timing and logic elements to achieve the timing and interrupt functions described above. The third input of the jumper 304 is driven by The CLK20UT signal is generated on the plug-in module. A middle conductor on the jumper 304 functions as the output of the jumper, so that the jumper effectively functions as a selector, choosing either the 32 MHz crystal locally generated (for developmental testing) not, or (operationally) the CLK20UT clock generated on the plug-in module by the 32 MHz crystal oscillator 209 (FIG. 4). The middle (output) pin of jumper 304, connected during operation to the clock from the plug-in module, drives the input of a non-inverting tristate buffer 322 (preferably a 74F125). The output of buffer 322 is connected in common to the output of another tristate buffer 323. At any given time, at most one of these two buffers is activated so as to control their common output.

A crystal oscillator 306 with 25 MHz frequency drives the input of second tristate buffer 323, preferably through a 33-ohm series resistor. An inverter 313 (preferably a 74F04) receives the ENCLK25MB# signal generated on the 80386SX plugged-in module. The 313 inverter enables the local 25 MHz signal to reach the output of tristate buffer 323 when the system is to operate with a 12.5 MHz clock.

The output node of the two tristate buffers 322 and 323 drives the CLK2IN input pin 5 of the 82C211 preferably through a 33-ohm series resistor.

In the above-described manner, the preferred circuitry selectively chooses between a 25 MHz oscillator (306) local to the system board (when no plug-in module is present), a 32 MHz oscillator (305) also local to the system board (used, e.g., during development), or the 32 MHz clock signal generated on the plug-in board (advantageously used during operation when the plug-in module is installed.

Referring to FIG. 5B, the NPINT output pin 4 of the 82C211 generates the 287INT signal. For reasons analogous to those discussed above, with respect to the HLDA hold acknowledge signal generated by the 80286 processor, it is desirable to remove the 287INT signal from the system when the 80386SX plug-in module is installed. The functional removal of the 287INT signal is achieved using a tri-state buffer 324, to whose input the 287INT signal from the 82C211 is fed. The SXINST signal (generated on FIG. B1) is high when the 80386SX plug-in module is installed, thereby disabling tristate buffer 324. Control of the NPINT net connected to the output of the tristate buffer 324 is thus surrendered to the inverter 214 (FIG. 3), described above.

As described above, the flip-flops 231 and 232, and gates 213, 222 and 214 contribute to control the co-processor interface, handling error conditions and re-clocking the signals as needed for proper functioning when the 80386SX plug-in module is installed.

In addition to the systems described above, the present invention also provides a method for upgrading a computer system having a system board including a first processor, the first processor having a first input which, when activated, causes the first processor to be disabled, the method comprising retaining the first processor on the system board; retaining the system board in the computer system; and installing a plug-in module into the computer system, the plug-in module comprising a second processor, having at least certain performance characteristics different than performance characteristics of the first processor, and an installation announcement circuit for generating an installation announcement signal when the plug-in module is installed in the computer system, in which method the installation of the plug-in module into the computer system causes functional disablement of the first processor.

TABLE I

Concordance For Signals For 80386SX Plug-In.

| Connector Pin | Signal Name | Plug-in Module Connection |
|---|---|---|
| 1 | BHE# | GAL ® 206-15 |
| 2 | S0# | GAL ® 206-16 |
| 3 | VCC | VCC |
| 4 | S1# | GAL ® 206-17 |
| 5 | — | — |
| 6 | M/IO# | 80386SX-23 (M/IO-); Gal ® 206-5 |
| 7 | VCC | VCC |
| 8 | — | — |
| 9 | — | — |
| 10 | — | — |
| 11 | VCC | VCC |
| 12 | RESET3 | GAL ® 202-3 |
| 13 | RESET4 | GAL ® 202-4 |
| 14 | — | — |
| 15 | VCC | VCC |
| 16 | — | — |
| 17 | — | — |
| 18 | — | — |
| 19 | VCC | VCC |
| 20 | OUTFO# | GAL ® 202-5 |
| 21 | 387INT | INVERTER 214 (NPINT) |
| 22 | REFREQ | GAL ® 202-7 |
| 23 | VCC | VCC |
| 24 | — | — |
| 25 | — | — |
| 26 | — | — |
| 27 | VCC | VCC |
| 28 | — | — |
| 29 | — | — |
| 30 | — | — |
| 31 | VCC | VCC |
| 32 | — | — |
| 33 | — | — |
| 34 | D0 | (DATA) |
| 35 | VCC | VCC |
| 36 | D1 | (DATA) |
| 37 | D2 | (DATA) |
| 38 | D3 | (DATA) |
| 39 | VCC | VCC |
| 40 | D4 | (DATA) |
| 41 | D5 | (DATA) |
| 42 | D6 | (DATA) |
| 43 | VCC | VCC |
| 44 | D7 | (DATA) |
| 45 | D8 | (DATA) |
| 46 | — | — |
| 47 | — | — |
| 48 | D10 | (DATA) |
| 49 | D11 | (DATA) |
| 50 | D12 | (DATA) |
| 51 | VCC | VCC |
| 52 | D13 | (DATA) |
| 53 | D14 | (DATA) |
| 54 | D15 | (DATA) |
| 55 | VCC | VCC |
| 56 | D9 | (DATA) |
| 57 | — | — |
| 58 | VCC | VCC |
| 59 | GND | GND |
| 60 | A0 | (ADDRESS) |
| 61 | A1 | (ADDRESS) |
| 62 | A2 | (ADDRESS) |
| 63 | GND | GND |
| 64 | A3 | (ADDRESS) |
| 65 | A4 | (ADDRESS) |
| 66 | A5 | (ADDRESS) |
| 67 | GND | GND |
| 68 | A6 | (ADDRESS) |
| 69 | A7 | (ADDRESS) |
| 70 | A8 | (ADDRESS) |
| 71 | GND | GND |
| 72 | A9 | (ADDRESS) |
| 73 | A10 | (ADDRESS) |
| 74 | A11 | (ADDRESS) |
| 75 | GND | GND |
| 76 | A12 | (ADDRESS) |
| 77 | A13 | (ADDRESS) |

TABLE I-continued
Concordance For Signals For 80386SX Plug-In

| Connector Pin | Signal Name | Plug-in Module Connection |
|---|---|---|
| 78 | A14 | (ADDRESS) |
| 79 | GND | GND |
| 80 | A15 | (ADDRESS) |
| 81 | A16 | (ADDRESS) |
| 82 | A17 | (ADDRESS) |
| 83 | GND | GND |
| 84 | A18 | (ADDRESS) |
| 85 | A19 | (ADDRESS) |
| 86 | CPUA20 | 80386SX-A20 (ADDRESS 20) |
| 87 | GND | GND |
| 88 | A21 | (ADDRESS) |
| 89 | A22 | (ADDRESS) |
| 90 | A23 | (ADDRESS) |
| 91 | GND | GND |
| 92 | — | — |
| 93 | INTR | 80386SX-40 (INTR) |
| 94 | NMI | 80386SX-38 (NMI) |
| 95 | GND | GND |
| 96 | — | — |
| 97 | HLDA | 80386SX-3 (HLDA) |
| 98 | HOLD | FLIP-FLOP 231-2 (D IN) |
| 99 | GND | GND |
| 100 | — | — |
| 101 | — | — |
| 102 | READY# | GATE 221-2 (2ND INPUT) |
| 103 | GND | GND |
| 104 | — | — |
| 105 | — | — |
| 106 | CLK2OUT | 32MHz XTAL OSC 209 (THRU RESISTOR) |
| 107 | GND | GND |
| 108 | — | — |
| 109 | PROCCLK | INVERTERS 211, 212 INPUTS |
| 110 | — | — |
| 111 | GND | — |
| 112 | ENCLK32MB# | JUMPER 241-1 (to GND) |
| 113 | ENCLK25MB# | JUMPER 242-1 (to GND) |
| 114 | SXINST# | GND |
| 115 | GND | GND |
| 116 | — | — |

TABLE II
80386SX Pin Connections

| 80386SX Pin : Label | Signal | Source/Dest |
|---|---|---|
| 1 : D0 | D0 | (DATA) |
| 2 : GND | GND | GND |
| 3 : HLDA | HLDA | CONNECTOR PIN 97 |
| 4 : HOLD | HOLD386 | GAL ® 202-20 |
| 5 : GND | GND | GND |
| 6 : NA- | NA# | GAL ® 206-13 |
| 7 : READY- | SXREADY# | GATE 221-3 (OUTPUT) |
| 8 : VCC | VCC | VCC |
| 9 : VCC | VCC | VCC |
| 10 : VCC | VCC | VCC |
| 11 : GND | GND | GND |
| 12 : GND | GND | GND |
| 13 : GND | GND | GND |
| 14 : GND | GND | GND |
| 15 : CLK2 | 386CLK2 | INVERTER 211 OUTPUT |
| 16 : ADS- | ADS# | PULLED UP; 80386SX-47 (ADS-); GAL ® 206-3 |
| 17 : A0 | A0 | (ADDRESS) |
| 18 : A1 | A1 | (ADDRESS) |
| 19 : BHE- | 386BHE# | PULLED; GAL ® 206-9 |
| 21 : VCC | VCC | VCC |
| 22 : GND | GND | GND |
| 23 : M/IO- | SXH/IO# | PULLED UP; GAL ® 206-5; GAL ® 202-14; 80387SX-44 (NPS1-) |
| 24 : D/C- | D/C# | PULLED UP; GAL ® 206-6 |
| 25 : W/R- | W/R# | PULLED UP; GAL ® 206-8; 80387SX-41 (W/R-) |
| 26 : LOCK- | — | — |
| 32 : VCC | VCC | VCC |
| 33 : RESET | RESET386 | GAL ® 202-19 |
| 34 : BUSY- | BUSY386# | GAL ® 202-15 |
| 35 : GND | GND | GND |
| 36 : ERROR- | — | VCC (THRU RESISTOR) |
| 37 : PEREQ | PEREQ386 | GAL ® 202-16 |
| 38 : NMI | NMI | CONNECTOR PIN 94 |
| 39 : VCC | VCC | VCC |
| 40 : INTR | INTR | CONNECTOR PIN 93 |
| 41 : GND | GND | GND |
| 42 : VCC | VCC | VCC |
| 48 : VCC | VCC | VCC |
| 49 : GND | GND | GND |
| 50 : GND | GND | GND |
| 51 : A2 | A2 | (ADDRESS) |
| 52 : A3 | A3 | (ADDRESS) |
| 53 : A4 | A4 | (ADDRESS) |
| 54 : A5 | A5 | (ADDRESS) |
| 55 : A6 | A6 | (ADDRESS) |
| 56 : A7 | A7 | (ADDRESS) |
| 57 : VCC | VCC | VCC |
| 58 : A8 | A8 | (ADDRESS) |
| 59 : A9 | A9 | (ADDRESS) |
| 60 : A10 | A10 | (ADDRESS) |
| 61 : A11 | A11 | (ADDRESS) |
| 62 : A12 | A12 | (ADDRESS) |
| 63 : GND | GND | GND |
| 64 : A13 | A13 | (ADDRESS) |
| 65 : A14 | A14 | (ADDRESS) |
| 66 : A15 | A15 | (ADDRESS) |
| 67 : GND | GND | GND |
| 68 : GND | GND | GND |
| 69 : VCC | VCC | VCC |
| 70 : A16 | A16 | (ADDRESS) |
| 71 : VCC | VCC | VCC |
| 72 : A17 | A17 | (ADDRESS) |
| 73 : A18 | A18 | (ADDRESS) |
| 74 : A19 | A19 | (ADDRESS) |
| 75 : A20 | CPUA20 | (ADDRESS BIT 20) |
| 76 : A21 | A21 | (ADDRESS) |
| 77 : GND | GND | GND |
| 78 : GND | GND | GND |
| 79 : A22 | A22 | (ADDRESS) |
| 80 : A23 | A23 | (ADDRESS) |
| 81 : D15 | D15 | (DATA) |
| 82 : D14 | D14 | (DATA) |
| 83 : D13 | D13 | (DATA) |
| 84 : VCC | VCC | VCC |
| 85 : GND | GND | GND |
| 86 : D12 | D12 | (DATA) |
| 87 : D11 | D11 | (DATA) |
| 88 : D10 | D10 | (DATA) |
| 89 : D9 | D9 | (DATA) |
| 90 : D8 | D8 | (DATA) |
| 91 : VCC | VCC | VCC |
| 92 : D7 | D7 | (DATA) |
| 93 : D6 | D6 | (DATA) |
| 94 : D5 | D5 | (DATA) |
| 95 : D4 | D4 | (DATA) |
| 96 : D3 | D3 | (DATA) |
| 97 : VCC | VCC | VCC |
| 98 : GND | GND | GND |
| 99 : D2 | D2 | (DATA) |
| 100 : D1 | D1 | (DATA) |

TABLE II
80387SX Pin Connections

| 80387SX Pin : Label | Signal | Source/Dest |
|---|---|---|
| 2 : D7 | D7 | (DATA) |
| 3 : D6 | D6 | (DATA) |
| 4 : VCC | VCC | VCC |

TABLE II-continued

80387SX Pin Connections

| 80387SX Pin : Label | Signal | Source/Dest |
|---|---|---|
| 5 : GND | — | GND |
| 6 : D5 | D5 | (DATA) |
| 7 : D4 | D4 | (DATA) |
| 8 : D3 | D3 | (DATA) |
| 9 : VCC | VCC | VCC |
| 11 : D15 | D15 | (DATA) |
| 12 : D14 | D14 | (DATA) |
| 13 : VCC | VCC | VCC |
| 14 : GND | GND | GND |
| 15 : D13 | D13 | (DATA) |
| 16 : D12 | D12 | (DATA) |
| 19 : D0 | D0 | (DATA) |
| 20 : D1 | D1 | (DATA) |
| 21 : GND | GND | GND |
| 22 : VCC | VCC | VCC |
| 23 : D2 | D2 | (DATA) |
| 24 : D8 | D8 | (DATA) |
| 25 : GND | GND | GND |
| 26 : VCC | VCC | VCC |
| 27 : GND | GND | GND |
| 28 : D9 | D9 | (DATA) |
| 29 : D10 | D10 | (DATA) |
| 30 : D11 | D11 | (DATA) |
| 31 : VCC | VCC | VCC |
| 32 : GND | GND | GND |
| 33 : VCC | VCC | VCC |
| 34 : GND | GND | GND |
| 35 : ERROR- | 387ERROR# | PULLED UP; GAL ® 202-9; GATE 223-4 (FIRST INPUT); GATE 213-5 (INPUT) |
| 36 : BUSY- | 387BUSY# | PULLED UP; GAL ® 202-6; FLIP-FLOP 232-12 (D INPUT) |
| 37 : VCC | VCC | VCC |
| 38 : GND | GND | GND |
| 39 : TIE HIGH | VCC | VCC |
| 40 : STEN | — | PULLED HIGH |
| 41 : W/R | W/R# | 80386SX-25 (W/R-) |
| 42 : GND | GND | GND |
| 43 : VCC | VCC | VCC |
| 44 : NPS1- | SXM/IO# | 80386SX-23 (M/IO-) |
| 45 : NPS2 | A23 | ADDRESS BIT 23 |
| 46 : VCC | VCC | VCC |
| 47 : ADS- | ADS# | 80386SX-16 (ADS-) |
| 48 : CMD- | A2 | ADDRESS BIT 2 |
| 49 : READY- | SXREADY# | GATE 221-3 (OUTPUT) |
| 50 : TIE HIGH | VCC | VCC |
| 51 : RESET | RESET387 | GAL ® 202-17 |
| 53 : 387CLK2 | — | — |
| 54 : 386CLK2 | 387CLK2 | INVERTER 212-4 (OUTPUT) |
| 55 : GND | GND | GND |
| 56 : PEREQ | 387PEREQ | TO GND THRU 1K RESISTOR; GAL ® 202-8 |
| 57 : READY0- | 387RDY# | PULLED UP; GATE 222-13 (2ND INPUT) |
| 58 : VCC | VCC | VCC |
| 59 : CKM | — | PULLED HIGH |
| 60 : GND | GND | GND |
| 61 : GND | GND | GND |
| 62 : VCC | VCC | VCC |
| 63 : GND | GND | GND |
| 64 : VCC | VCC | VCC |
| 66 : GND | NPRES# | PULLED UP; GAL ® 202-11 |

APPENDIX A

GAL(R) Equations for First GAL(R) 206 (Figure 3)

```
                        Name
Partno          xxxxxx  ;
Location        U1      ;
Revision        A       ;
Assembly        xxxxxx  ;
Device          g16v8   ;
FORMAT          j       ;
Date            06/23/89;
Designer        N. HACK ;
Company         ALR     ;

/** Inputs **/
pin [1..9,11]   = [clk,reset,!ads,!ready,mio,dc,sclk,wr,!bhe,!oe];
pin 12          = !g ;
/** Outputs **/
```

```
pin [19..16]      = [!pipecyc,!buscyc,!mods1,!mods0];
pin [15..13]      = [!modbhe,!hltrdy,!na];

$define idle      'b'00
$define active    'b'10
$define pipelined 'b'11
$define notall    'b'01 memr = mio & !wr       ;
memw = mio &  wr       ; /* memory write or halt */
halt = mio &  wr & !dc ;
ior  = !mio & !wr      ;
iow  = !mio &  wr      ;
inta = !mio & !wr & !dc ;

field busstate = ![buscyc,pipecyc] ;

sequence busstate (
present idle
   if    g & ads & sclk & !reset              next active    ;
   default                                    next idle      ;

present active
   if         reset                           next idle      ;
   if    !ads & sclk & !reset & ready         next idle      ;
   if    g & ads & sclk & !reset & !ready     next pipelined ;
   default                                    next active    ;

present pipelined
   if    ready & sclk & !reset                next active    ;
   if    reset                                next idle      ;
   default                                    next pipelined ;

present notall               -                next idle      ;
)

mods0.d = memw & busstate:idle      & ads & sclk           & !reset & g
        # memw & busstate:active    & ads & sclk & ready   & !reset & g
        # memw & busstate:pipelined       & sclk & ready   & !reset & g
        # halt & busstate:idle      & ads & sclk           & !reset & g
        # halt & busstate:active    & ads & sclk & ready   & !reset & g
```

```
      # halt  & busstate:pipelined    & sclk & ready & !reset & g
      # inta  & busstate:idle    & ads & sclk         & !reset & g
      # inta  & busstate:active  & ads & sclk & ready & !reset & g
      # inta  & busstate:pipelined    & sclk & ready & !reset & g
      # iow   & busstate:idle    & ads & sclk         & !reset & g
      # iow   & busstate:active  & ads & sclk & ready & !reset & g
      # iow   & busstate:pipelined    & sclk & ready & !reset & g
      # mods0 & !sclk & !reset;

mods1.d = memr  & busstate:idle    & ads & sclk         & !reset & g
        # memr  & busstate:active  & ads & sclk & ready & !reset & g
        # memr  & busstate:pipelined    & sclk & ready & !reset & g
        # halt  & busstate:idle    & ads & sclk         & !reset & g
        # halt  & busstate:active  & ads & sclk & ready & !reset & g
        # halt  & busstate:pipelined    & sclk & ready & !reset & g
        # inta  & busstate:idle    & ads & sclk         & !reset & g
        # inta  & busstate:active  & ads & sclk & ready & !reset & g
        # inta  & busstate:pipelined    & sclk & ready & !reset & g
        # ior   & busstate:idle    & ads & sclk         & !reset & g
        # ior   & busstate:active  & ads & sclk & ready & !reset & g
        # ior   & busstate:pipelined    & sclk & ready & !reset & g
        # mods1 & !sclk & !reset ;

na.d    = busstate:[idle,active] & ads & sclk & !reset & g
        # na & !sclk & !reset ;

hltrdy.d = mods1 & mods0 & mio & wr & !dc & sclk & !reset
         # hltrdy & !sclk & !reset ;

modbhe.d = bhe & busstate:idle    & ads & sclk         & !reset
         # bhe & busstate:active  & ads & sclk & ready & !reset
         # bhe & busstate:pipelined    & sclk & ready & !reset
         # modbhe & !ready & !reset
         # modbhe & !sclk  & !reset ;
```

APPENDIX B

GAL(R) Equations for Second GAL(R) 202 (Figure 3)

```
        module MU81SX
        FLAG '-R2'
        title '387sx
```

Engineer : DT
Date     : 5/5/89
LOCATION : U81'

```
            PU81SX          device 'P20V8R';

" inputs

CLK             PIN     1;      " 32 MHZ CLOCK
            CHOLD           PIN     2;
            RESET3          PIN     3;
            RESET4          PIN     4;
            OUTF0_          PIN     5;      "
            N9BUSY_         PIN     6;      "
            REFREQ          PIN     7;      "
            N9PEREQ         PIN     8;      "
            N9ERROR_        PIN     9;      "
            ERRLTCH         PIN     10;
            NPPRES_         PIN     11;
            NMIO            PIN     14;
            A23             PIN     23;

" OUTPUTS

NBUSY_          PIN     15;
            PEREQ           PIN     16;
            NPRESET         PIN     17;
            SCLK            PIN     18;
            NRESET3         PIN     19;
            NHOLD           PIN     20;
            RSTERR_         PIN     21;
            G_              PIN     22;

EQUATIONS

SCLK := !SCLK;
            NRESET3 := !SCLK & RESET3
                    # !SCLK & RESET4
                    # SCLK & NRESET3;
```

```
NPRESET := !SCLK & RESET4
        # SCLK & NPRESET;
NBUSY_  = N9BUSY_
        # !ERRLTCH
        # NPPRES_ & REFREQ;
NHOLD  := !SCLK & CHOLD
        # SCLK & NHOLD;
!RSTERR_ = RESET4
        # !OUTFO_;
PEREQ  = N9PEREQ
        # N9BUSY_ & !ERRLTCH;
!G_    = NPPRES_ # NMIO # !A23;

END MU81SX
```

Conclusion

From the above, it is apparent that many modifications and variations of the present invention are possible in light of the above teachings. It is therefore to be understood that, within the scope of the appended claims, the invention may be practiced otherwise than as specifically described.

What is claimed is:

1. An upgraded computer system, comprising:
   1) a system board including at least a part of a first chip set, the first chip set including:
      a) an 80286 processor chip having a HOLD input, the 80286 processor chip having status and control signals of an 80286 timing and format;
      b) an 82C211 chip; and
      c) a numeric processor interrupt disable circuit, receiving an interrupt signal from the 82C211 chip;
   2) an 80386SX plug-in module including:
      a) an 80386SX processor socket in which is inserted an 80386SX processor chip, the 80386SX processor chip having status and control signals of an 80386SX timing and format;
      b) an 80387SX co-processor socket;
      c) translation circuitry which translates status and control signals from the 80386SX timing and format to the 80286 timing and format, the translation circuitry including programmable arrays of logic elements whose composite function is determined by programming a plurality of equations thereinto;
      d) a numeric processor interrupt circuit which generates a plug-in numeric processor interrupt signal under certain conditions;
      e) a first clock selection circuit which determines the characteristics of clock signal which is used by clock generation circuitry within the 82C211 chip; and
      f) an installation announcement circuit, the installation announcement circuit including a connection from an SXINST# pin on a plug-in connector to ground, the connection from the SXINST# to ground providing an installation announcement signal to which the 80286 processor is responsive whenever the plug-in module is installed, the installation announcement signal causing disablement of the 82086 processor without its physical removal from the system board while allowing the 80386SX processor to assume functions in the computer system otherwise performed by the 80286 processor, the installation announcement signal also causing the numeric processor interrupt disable circuit to prevent the interrupt signal from the 82C211 from reaching any portion of the computer system; and
   3) a connector, in electrical contact with both the system board and the installed plug-in module, for carrying the SXINST# signal from the installation announcement circuit on the 80386SX plug-in module to control the HOLD input of the 80286 processor and the numeric processor interrupt disable circuit on the system board.

2. The upgraded computer system of claim 1, wherein:
   the installation announcement circuit includes a conductive pathway, and includes no active circuit elements.

3. A base computer system with modular upgrade capability, in which installation of a module which is not originally part of the base computer system causes functional disablement of a first processor without its physical removal from the computer system, while allowing a second processor on the module to assume functions which would otherwise be performed by the first processor, the base computer system having an expansion bus with a set of expansion bus signal paths, the base computer system comprising:
   a) the first processor, having a first input which, when activated, disables the first processor;
   b) an OR circuit having an output signal which is input to the first input of the first processor, the OR circuit having respective inputs responsive to:
      1) a first signal generated from within the base computer system, the first signal for causing functional disablement of the first processor when the first signal is active and a module is not installed in the base computer system; and 2) an installation announcement signal output by the module when the module is installed, the installation announcement signal being restricted to a path in the base computer system which is electrically separate from the expansion bus signals paths, thereby causing functional disablement only of the first processor and of minimal portions of the base computer system to allow the second processor to assume functions otherwise performed by the first processor; and c) the path which carries the installation announcement signal to the OR circuit.

4. The base computer system of claim 3, wherein the first processor has a first output which, when activated, acknowledges disablement of the first processor, the system further comprising:

c) an acknowledgement isolation circuit, including:
1) an input responsive to the first output of the first processor;
2) an output which may either be
   i) responsive to the first output of the first processor; or
   ii) rendered inactive; and
3) an enable input responsive to the installation announcement signal for controlling whether the output of the acknowledgement isolation circuit is responsive to the first output of the first processor or whether it is rendered inactive.

5. The system of claim 3, wherein:
the first processor is part of a first integrated circuit chip; and
the OR circuit is separate from the first integrated circuit chip.

6. The system of claim 3, wherein:
the first processor is part of a first integrated circuit chip; and
the OR circuit is part of a second integrated circuit chip which is separate from the first integrated circuit chip.

7. The system of claim 3, wherein:
the OR circuit employs a negative logic in which any "0" input signal causes the output of the OR circuit to be active.

8. The system of claim 3, wherein:
the first input of the first processor is an input which, when activated, does not disable the first processor until the end of a current instruction cycle.

9. The system of claim 3, wherein:
the first input of the first processor is an input which, when activated, causes the first processor to activate a hold acknowledge output signal.

10. A base computer system with modular upgrade capability, in which installation of a module which is not originally part of the base computer system causes functional disablement of at least a portion of the base computer system without its physical removal from the computer system, while allowing the module to assume functions which would otherwise be performed by the disabled portions of the base computer system, the module generating an installation announcement signal when installed in the base computer system, the base computer system comprising:

a) a circuit which generates a local numeric processor interrupt signal;

b) a numeric processor interrupt isolation circuit, including:
1) an input responsive to the local numeric processor interrupt signal;
2) an output which may either be
   i) responsive to the local numeric processor interrupt signal; or
   ii) rendered inactive; and
3) an enable input, responsive to the installation announcement signal from the module, the enable input controlling whether the output of the numeric processor interrupt isolation circuit (i) is responsive to the local numeric processor interrupt signal or (ii) is rendered inactive.

11. A base computer system with modular upgrade capability, in which installation of a module which is not originally part of the base computer system cause disablement of a first processor without its physical removal from the computer system, so as to allow a second processor on the module to assume functions otherwise performed by the first processor, the base computer system having an expansion bus with a set of expansion bus signal paths, the base computer system comprising:

a) the first processor, having a first input which, when activated, disables the first processor;

b) an OR circuit having an output signal which is input to the first input of the first processor, the OR circuit having respective inputs responsive to:
1) a first signal generated from within the base computer system, the first signal for causing disablement of the first processor when the first signal is active and a module is not installed in the base computer system; and
2) an installation announcement signal which is generated when the module is installed into the base computer system, the installation announcement signal being restricted to a path in the base computer system which is electrically separate from the expansion bus signal paths, thereby causing functional disablement only of the first processor and of minimal portions of the base computer system to allow the second processor to assume functions otherwise performed by the first processor; and c) the path which carries the installation announcement signal to the OR circuit.

12. The system of claim 11, wherein:
the first processor is part of a first integrated circuit chip; and
the OR circuit is separate from the first integrated circuit chip.

13. The system of claim 11, wherein:
the first processor is part of a first integrated circuit chip; and
the OR circuit is part of a second integrated circuit chip which is separate from the first integrated circuit chip.

14. The system of claim 11, wherein:
the OR circuit employs a negative logic in which any "0" signal causes the output of the OR circuit to be active.

15. The system of claim 11, wherein:
the first input of the first processor is an input which, when activated, does not disable the first processor until the end of a current instruction cycle.

16. The system of claim 11, wherein:
the first input of the first processor is an input which, when activated, causes the first processor to activate a hold acknowledge output signal.

17. A base computer system with modular upgrade capability, in which installation of a module which is not originally part of the base computer system causes disablement of a first processor without its physical removal from the computer system, so as to allow a second processor on the module to assume functions otherwise performed by the first processor, the base computer system having an expansion bus with a set of expansion bus signal paths, the base computer system comprising:
 a) the first processor, having a first input which, when activated, disables the first processor;
 b) means for providing a disabling signal to the first input of the first processor, in response to (1) a first signal generated from within the base computer system, the first signal causing disablement of the first processor when the first signal is active and a module is not installed in the base computer system, or (2) an installation announcement signal output by the module when the module is installed into the base computer system, the installation announcement signal thereby causing functional disablement of the first processor so as to allow the second processor to assume functions otherwise performed by the first processor, wherein the means for providing the disabling signal constitutes means for providing the disabling signal only to the first processor and to portions of the base computer system other than the expansion bus, which portions if not disabled would interfere with the second processor's assuming functions otherwise performed by the first processor; and
 c) a path for carrying the installation announcement signal to the means for providing, the path being electrically separate from the expansion bus signal paths.

18. The system of claim 17, wherein:
 the first processor is part of the first integrated circuit chip; and
 the providing means is separate form the first integrated circuit chip.

19. The system of claim 17, wherein:
 the first processor is part of a first integrated circuit chip; and
 the providing means is part of a second integrated circuit chip which is separate from the first integrated circuit chip.

20. The system of claim 17, wherein:
 the providing means employs a negative logic in which any "O" input signal causes the output of the providing means to be active.

21. The system of claim 17, wherein:
 the first input of the first processor is an input which, when activated, does not disable the first processor until the end of a current instruction cycle.

22. The system of claim 17, wherein:
 the first input of the first processor is an input which, when activated, causes the first processor to activate a hold acknowledge output signal.

23. An upgraded computer system having an expansion bus with a set of expansion bus signal paths, the upgraded computer system comprising:
 1) a first processor having a first input which, when activated, disables the first processor;
 2) a module including:
  a) a second processor, having at least certain performance characteristics different than performance characteristics of the first processor; and
  b) an installation announcement circuit for generating an installation announcement signal whenever the module is installed in the computer system, the first input of the first processor being responsive to the installation announcement signal to cause disablement of the first processor without its physical removal from the computer system, the installation announcement signal not causing disablement of any portion of the computer system other than the first processor and portions of the computer system which if not disabled would interfere with the second processor's assuming functions otherwise performed by the first processor; and
 3) a path, being electrically separate from the expansion bus signal paths, for carrying the installation announcement signal from the module only to the processor and to the portions which if not disabled would interfere with the second processor's assuming functions otherwise performed by the first processor;
 wherein the installation announcement circuit generates the installation announcement signal to cause disablement of (1) a disable acknowledge signal indicating disablement of the first processor to the remainder of the computer system, as well as (2) a co-processor interrupt which, if not disabled, would interfere with the operation of the second processor.

24. The computer system of claim 23, wherein the first input is a HOLD input.

25. The upgraded computer system of claim 23, wherein:
 the installation announcement circuit is located outside an integrated circuit chip in which the second processor is located.

26. The upgraded computer system of claim 23, wherein the installation announcement circuit includes:
 a short circuit pathway extending between (1) a predetermined constant signal level and (2) a pathway to which the first input of the first processor is responsive.

27. The upgraded computer system of claim 26, wherein the installation announcement circuit consists essentially of:
 a short circuit pathway extending between (1) ground and (2) a pathway to which the first input of the first processor is responsive.

28. The upgraded computer system of claim 23, wherein:
 the first processor has associated therewith a first bus with first bus characteristics;
 the second processor has associated therewith a second bus with second bus characteristics; and
 the module includes means to ensure full compatibility between the first bus characteristics and the second bus characteristics.

29. A base computer system with modular upgrade capability, in which installation of a module which is not originally part of the base computer system caused disablement of a first processor without its physical removal from the computer system, while allowing a second processor on the module to assume functions which would otherwise be performed by the first processor, the base computer system having an expansion bus with a set of expansion bus signal paths, the base computer system comprising:
a) the first processor, having a first input which, when activated, disables the first processor;
b) means for providing a disabling signal to the first input of the first processor, in response to (1) a first signal generated from within the base computer system, the first signal for causing disablement of the first processor when the first signal is active and a module is not installed in the base computer system, for (2) an installation announcement signal output by the module whenever it is installed in the base computer system;
c) means for disabling signals generated in the base computer system ('b) which, if not disabled, would indicate disablement of the first processor to the remainder of the base computer system or (2) which, if not disabled, would interfere with control exerted by the module; and
d) a path for carrying the installation announcement signal to the means for providing and to the means for disabling, the path being electrically separate from the expansion bus signal paths.

30. The base computer system of claim 29, wherein the first input is a HOLD input.

31. The base computer system of claim 29, wherein the installation announcement circuit generates the installation announcement signal to cause disablement of (1) any disable acknowledge signal associated with the first processor as well as (2) any co-processor interrupts, which would otherwise interfere with the operation of the second processor.

32. The base computer system of claim 29, wherein the first processor has a first output which, when activated, acknowledges disablement of the first processor, the system further comprising:
c) an acknowledgement isolation circuit, including:
1) an input responsive to the first output of the first processor;
2) an output which may either be
  i) responsive to the first output of the first processor; or
  ii) rendered inactive; and
3) an enable input responsive to the installation announcement signal for controlling whether the output of the acknowledgement isolation circuit is responsive to the first output of the first processor or whether it is rendered inactive.

33. The system of claim 29, wherein:
the first processor is part of a first integrated circuit chip; and
the providing means is separate from the first integrated circuit chip.

34. The system of claim 29, wherein:
the first processor is part of a first integrated circuit chip; and
the providing means is part of a second integrated circuit chip which is separate from the first integrated circuit chip.

35. The system of claim 29, wherein:
the providing means employs a negative logic in which any "0" input signal causes the output of the providing means to be active.

36. The system of claim 29, wherein:
the first input of the first processor is an input which, when activated, does not disable the first processor until the end of a current instruction cycle.

37. The system of claim 29, wherein:
the first input of the first processor is an input which, when activated, causes the first processor to activate a hold acknowledge output signal.

38. An upgraded computer system having an expansion bus with a set of expansion bus signal paths, the upgraded computer system comprising:
1) a first processor having a first input which, when activated, disables the first processor;
2) a module installed in the computer system, the module including a second processor and an installation announcement circuit for generating an installation announcement signal whenever the module is installed in the computer system;
3) a first path, being electrically separate from the expansion bus signal paths, for carrying to the first input a disabling signal determined by the installation announcement signal so that installation of the module causes disablement of the first processor without its physical removal from the computer system, the first path carrying the disabling signal leading only to portions of the computer system which, if not disabled, would interfere with the second processor's assuming functions otherwise performed by the first processor; and
4) a second path, being electrically separate from the expansion bus signal paths, for carrying the installation announcement signal from the module to activate the disabling signal;
wherein the installation announcement circuit generates the installation announcement signal to cause disablement of (1) a disable acknowledge signal indicating disablement of the first processor to the remainder of the computer system, as well as (2) a co-processor interrupt which, if not disabled, would interfere with the operation of the second processor.

39. The upgraded computer system of claim 38, wherein the first input is a HOLD input.

40. The upgraded computer system of claim 38, wherein:
the installation announcement circuit is located outside an integrated circuit chip in which the second processor is located.

41. The upgraded computer system of claim 38, wherein the installation announcement circuit includes:
a short circuit pathway extending between (1) a predetermined constant signal level and (2) a pathway in which the first input of the first processor is responsive.

42. The upgraded computer system of claim 41, wherein the installation announcement circuit includes:
a short circuit pathway extending between (1) ground and (2) a pathway to which the first input of the first processor is responsive.

43. The upgraded computer system of claim 38, wherein:
the first processor has associated therewith a first bus with first bus characteristics;
the second processor has associated therewith a second bus with second bus characteristics; and
the module includes means to ensure full compatibility between the first bus characteristics and the second bus characteristics.

44. A base computer system with modular upgrade capability, in which installation of a module which is not originally part of the base computer system causes disablement of a first processor without its physical removal from the computer system, so as to allow a second processor on the module to assume functions otherwise performed by the first processor, the base computer system having an expansion bus with a set of expansion bus signal paths, the base computer system comprising:
- a) the first processor, having a first input which, when activated, disables the first processor;
- b) means for providing a disabling signal to the first input of the first processor, in response to:
  - (1) a first signal generated from within the base computer system, the first signal causing disablement of the first processor when the first signal is active and a module is not installed in the base computer system, or
  - (2) an installation announcement signal generated by the module whenever the module is installed in the base computer system so as to cause disablement of the first processor and allow the second processor to assume functions otherwise performed by the first processor;
- c) means for disabling signals generated in the base computer system (1) which, if not disabled, would indicate disablement of the first processor to the remainder of the base computer system or (2) which, if not disabled, would interfere with control exerted by the module; and
- d) a path for carrying the installation announcement signal to the means for providing and to the means for disabling, the path being electrically separate from the expansion bus signal paths.

45. The base computer system of claim 44, wherein the first input is a HOLD input.

46. The base computer system of claim 44, wherein the means for disabling includes:
means for disabling (1) any disable acknowledge signal associated with the first processor as well as (2) any co-processor interrupts, which would otherwise interfere with the operation of the second processor.

47. The system of claim 44, wherein:
the first processor is part of a first integrated circuit chip; and
the providing means is separate from the first integrated circuit chip.

48. The system of claim 44, wherein:
the first processor is part of a first integrated circuit chip; and
the providing means is part of a second integrated circuit chip which is separate from the first integrated circuit chip.

49. The system of claim 44, wherein:
the providing means employs a negative logic in which any "O" input signal causes the output of the providing means to be active.

50. The system of claim 44, wherein:
the first input of the first processor is an input which, when activated, does not disable the first processor until the end of a current instruction cycle.

51. The system of claim 44, wherein:
the first input of the first processor is an input which, when activated, causes the first processor to activate a hold acknowledge output signal.

52. A base computer system with modular upgrade capability, in which installation of a module which is not originally part of the base computer system causes disablement of a first processor without its physical removal from the computer system, so as to allow a second processor on the module to assume functions otherwise performed by the first processor, the base computer system having an expansion bus with a set of expansion bus signal paths, the base computer system comprising:
- a) the first processor, having a first input which, when activated, disables the first processor;
- b) a first path for carrying to the first input a disabling signal determined by an installation announcement signal which is generated whenever the module is installed in the base computer system, the first path leading only to the first processor and portions of the computer system which, if not disabled, would interfere with the second processor's assuming functions otherwise performed by the first processor; and
- c) a second path, electrically separate from the expansion bus signal paths, for carrying the installation announcement signal from the module to activate the disabling signal;
wherein the first path, leads only to the first processor, to disable acknowledge signal gating means associated with the first processor, and to co-processor interrupt gating means, which, if not disabled, would interfere with the operation of the second processor.

53. The base computer system of claim 52, wherein the first input is a HOLD input.

54. The base computer system of claim 52, wherein:
the installation announcement signal is a predetermined constant signal level provided to a first pin on a connector to the module, the first pin being adjacent a pin which receives the installation announcement signal from the module.

55. The base computer system of claim 54, wherein:
the predetermined constant signal level is ground, the installation announcement signal constituting a short circuit to ground when the module is installed in the base computer system.

56. An upgraded computer system, comprising:
1) a first processor having a first input which, when activated, disables the first processor; and
2) a module consisting essentially of:
- a) a second processor and any related co-processor, having at least certain performance characteristics different than performance characteristics of the first processor;
- b) an installation announcement circuit for generating an installation announcement signal when the module is installed in the computer system, the first input of the first processor being responsive to the installation announcement signal to cause disablement of the first processor without its physical removal from the computer system, the installation announcement signal not causing disablement of any portion of the computer system other than the first processor and portions of the computer system which, if not disabled, would interfere with the second processor's assuming functions otherwise performed by the first processor;
- c) translation circuitry making a bus of the first processor compatible with a bus of the second processor; and
- d) means for allowing the second processor, installation announcement circuit, and translation circuitry to operate properly;

wherein the installation announcement circuit generates the installation announcement signal to cause disablement of (1) a disable acknowledge signal indicating disablement of the first processor to the remainder of the computer system as well as (2) a co-processor interrupt which, if not disabled, would interfere with the operation of the second processor.

57. The computer system of claim 56, wherein:
the module's second processor is an integrated circuit chip; and
the module has no cache memory outside the integrated circuit chip.

58. The computer system of claim 56, wherein:
the translation circuit includes arrays of logic elements which are responsive to signals on the respective busses of the first and second processors and which provide other signals to the respective busses of the first and second processors.

59. The upgraded computer system of claim 24, wherein:
the installation announcement circuit is located outside an integrated circuit chip in which the second processor is located.

60. The upgraded computer system of claim 24, wherein: the installation announcement circuit includes:
a short circuit pathway extending between (1) a predetermined constant signal level and (2) a pathway to which the first input of the first processor is responsive.

61. The upgraded computer system of claim 60, wherein the installation announcement circuit consists essentially of:
a short circuit pathway extending between (1) ground and (2) a pathway to which the first input of the first processor is responsive.

62. The upgraded computer system of claim 24, wherein:
the first processor has associated therewith a first bus with first bus characteristics;
the second processor has associated therewith a second bus with second bus characteristics; and
the module includes means to ensure full compatibility between the first bus characteristics and the second bus characteristics.

63. The upgraded computer system of claim 56, wherein the means for allowing includes:
a power bus;
a ground bus;
a circuit board providing support for the foregoing elements;
a connector on an edge of the circuit board; and
conductive pathways interconnecting the foregoing elements.

* * * * *